(12) United States Patent
Miura

(10) Patent No.: US 8,293,677 B2
(45) Date of Patent: Oct. 23, 2012

(54) CORE-SHELL STRUCTURE, PROCESS FOR ITS PRODUCTION, AND EXHAUST GAS PURIFICATION CATALYST COMPRISING CORE-SHELL STRUCTURE

(75) Inventor: Masahide Miura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 192 days.

(21) Appl. No.: 12/451,089

(22) PCT Filed: May 21, 2008

(86) PCT No.: PCT/JP2008/059755
§ 371 (c)(1),
(2), (4) Date: Oct. 26, 2009

(87) PCT Pub. No.: WO2008/146823
PCT Pub. Date: Dec. 4, 2008

(65) Prior Publication Data
US 2011/0152072 A1   Jun. 23, 2011

(30) Foreign Application Priority Data

May 23, 2007   (JP) .................. 2007-136420

(51) Int. Cl.
*B01J 23/10*   (2006.01)
*B01J 23/00*   (2006.01)
*B01J 8/02*   (2006.01)
*B01D 53/56*   (2006.01)
*B01D 53/94*   (2006.01)
*C01B 21/00*   (2006.01)
*C01B 23/00*   (2006.01)
*C01B 25/00*   (2006.01)
*C01B 31/00*   (2006.01)
*C01B 33/00*   (2006.01)
*C01B 35/00*   (2006.01)
*C01G 28/00*   (2006.01)
*C01G 30/00*   (2006.01)
*B32B 5/16*   (2006.01)
*B32B 9/00*   (2006.01)
*B32B 15/02*   (2006.01)
*B32B 17/02*   (2006.01)
*B32B 19/00*   (2006.01)
*B32B 21/02*   (2006.01)
*B32B 23/02*   (2006.01)
*B32B 27/02*   (2006.01)

(52) U.S. Cl. ............... 502/304; 502/349; 423/213.2; 428/403

(58) Field of Classification Search ............ 502/304, 502/349; 423/213.2; 428/403
See application file for complete search history.

(56) References Cited

U.S. PATENT DOCUMENTS 4,422,960 A   12/1983   Shiroto et al.
(Continued)

FOREIGN PATENT DOCUMENTS

CN   1060793 A   5/1992
(Continued)

OTHER PUBLICATIONS

Office Action (Non-Final Office Action) issued in U.S. Appl. No. 10/593,629 on Mar. 25, 2010.
(Continued)

*Primary Examiner* — Patricia L Hailey
(74) *Attorney, Agent, or Firm* — Oliff & Berridge, PLC

(57) ABSTRACT

There is provided a core-shell structure characterized by comprising a core section composed mainly of a first metal oxide and a shell section composed mainly of a second metal oxide different from the first metal oxide, wherein the thickness of the shell section is no greater than 20 nm.

11 Claims, 2 Drawing Sheets

U.S. PATENT DOCUMENTS

| | | | |
|---|---|---|---|
| 4,448,895 A | 5/1984 | Ono et al. | |
| 4,981,825 A | 1/1991 | Pinnavaia et al. | |
| 5,182,249 A | 1/1993 | Wang et al. | |
| 5,232,889 A | 8/1993 | Blanchard et al. | |
| 5,334,570 A | 8/1994 | Beauseigneur et al. | |
| 5,346,875 A | 9/1994 | Wachter et al. | |
| 5,352,646 A | 10/1994 | Blanchard et al. | |
| 5,439,865 A | 8/1995 | Abe et al. | |
| 5,492,870 A | 2/1996 | Wilcox et al. | |
| 5,607,892 A | 3/1997 | Chopin et al. | |
| 5,753,581 A | 5/1998 | Beckmeyer et al. | |
| 5,935,889 A | 8/1999 | Murrell et al. | |
| 6,083,868 A | 7/2000 | Yoshida et al. | |
| 6,358,880 B1 | 3/2002 | Hedouin et al. | |
| 6,528,451 B2 | 3/2003 | Brezny et al. | |
| 6,773,814 B2 | 8/2004 | Schumacher et al. | |
| 6,911,414 B2 | 6/2005 | Kimura et al. | |
| 7,052,777 B2 * | 5/2006 | Brotzman et al. | 428/570 |
| 7,314,846 B2 | 1/2008 | Kuno | |
| 7,384,888 B2 | 6/2008 | Kuno | |
| 2002/0049137 A1 | 4/2002 | Morikawa et al. | |
| 2002/0098975 A1 | 7/2002 | Kimura et al. | |
| 2003/0007926 A1 | 1/2003 | Jiang et al. | |
| 2003/0104198 A1 | 6/2003 | Schumacher et al. | |
| 2004/0082468 A1 | 4/2004 | Suzawa et al. | |
| 2004/0087440 A1 | 5/2004 | Kuno | |
| 2004/0186016 A1 | 9/2004 | Bog et al. | |
| 2005/0059547 A1 | 3/2005 | Kuno | |
| 2007/0129246 A1 | 6/2007 | Miura | |
| 2007/0179052 A1 | 8/2007 | Hirabayashi et al. | |
| 2007/0197373 A1 | 8/2007 | Miura et al. | |
| 2007/0197379 A1 | 8/2007 | Miura | |
| 2007/0281160 A1 * | 12/2007 | Krishna et al. | 428/403 |
| 2008/0051283 A1 | 2/2008 | Miura | |
| 2009/0191128 A1 * | 7/2009 | Ronda et al. | 424/9.4 |

FOREIGN PATENT DOCUMENTS

| | | |
|---|---|---|
| DE | 94 03 581 U1 | 4/1994 |
| EP | 0 430 744 A | 6/1991 |
| EP | 0 524 643 A | 1/1993 |
| EP | 1 175 935 A | 1/2002 |
| EP | 1 284 277 A1 | 2/2003 |
| EP | 1 371 415 A1 | 12/2003 |
| EP | 1 415 956 A2 | 5/2004 |
| EP | 1 516 855 A1 | 3/2005 |
| EP | 1 579 912 A2 | 9/2005 |
| FR | 2 836 067 A | 8/2003 |
| JP | A-03-277060 | 12/1991 |
| JP | A-06-279027 | 10/1994 |
| JP | A-8-103650 | 4/1996 |
| JP | A-8-109020 | 4/1996 |
| JP | A-8-109021 | 4/1996 |
| JP | A-9-255331 | 9/1997 |
| JP | A-10-194742 | 7/1998 |
| JP | A-10-258232 | 9/1998 |
| JP | A-2000-503594 | 3/2000 |
| JP | A-2000-319019 | 11/2000 |
| JP | A-2001-89143 | 4/2001 |
| JP | A-2002-110261 | 4/2002 |
| JP | A-2002-331238 | 11/2002 |
| JP | A-2002-346386 | 12/2002 |
| JP | A-2003-117393 | 4/2003 |
| JP | A-2003-277060 | 10/2003 |
| JP | A-2004-74138 | 3/2004 |
| JP | A-2005-254047 | 9/2005 |
| JP | A-2005-313024 | 11/2005 |
| JP | A-2005-313028 | 11/2005 |
| JP | A-2005-314134 | 11/2005 |
| KR | 10-0295168 B1 | 9/2001 |
| WO | WO 98/14274 A1 | 4/1998 |
| WO | WO 03/037506 A1 | 5/2003 |
| WO | WO 2005/102933 A2 | 11/2005 |
| WO | WO 2007/113674 A2 | 10/2007 |

OTHER PUBLICATIONS

Office Action (Final Office Action) issued in U.S. Appl. No. 10/589,669 on May 19, 2010.

Dec. 27, 2010 Office Action issued in U.S. Appl. No. 10/593,629.

Aug. 8, 2011 Korean Office Action issued in Korean Patent Application No. 10-2009-7024191 (with translation).

John Dalton Wright et al., Sol-Gel Materials: Chemistry and Applications, 2001, CRC Press, Sect 1.4.

U.S. Appl. No. 10/588,603, filed Aug. 7, 2006 in the name of Takeshi Hirabayashi et al.

Office Action (Non-Final Rejection) issued in U.S. Appl. No. 10/588,603 on Aug. 19, 2008.

Office Action (Non-Final Rejection) issued in U.S. Appl. No. 10/588,603 on Apr. 1, 2009.

Notice of Allowance issued in U.S. Appl. No. 10/588,603 on Nov. 24, 2009.

U.S. Appl. No. 10/589,421, filed Aug. 15, 2006 in the name of Masahide Miura.

Office Action (Non-Final Rejection) issued in U.S. Appl. No. 10/589,421 on Sep. 17, 2008.

Office Action (Non-Final Rejection) issued in U.S. Appl. No. 10/589,421 on Apr. 14, 2009.

Notice of Allowance issued in U.S. Appl. No. 10/589,421 on Sep. 18, 2009.

U.S. Appl. No. 10/589,669, filed Aug. 16, 2006 in the name of Masahide Miura.

Office Action (Requirement for Restriction/Election) issued in U.S. Appl. No. 10/589,669 on Aug. 12, 2008.

Office Action (Non-Final Rejection) issued in U.S. Appl. No. 10/589,669 on Nov. 5, 2008.

Office Action (Final Rejection) issued in U.S. Appl. No. 10/589,669 on Apr. 28, 2009.

Office Action (Non-Final Rejection) issued in U.S. Appl. No. 10/589,669 on Nov. 18, 2009.

U.S. Appl. No. 10/593,629, filed Sep. 21, 2006 in the name of Masahide Miura.

Korean Patent Office, Notice of Grounds for Rejection mailed Mar. 29, 2012 in Korean Patent Application No. 10-2009-7024191 w/English-language Translation.

\* cited by examiner

Fig.2
(a)
(b)
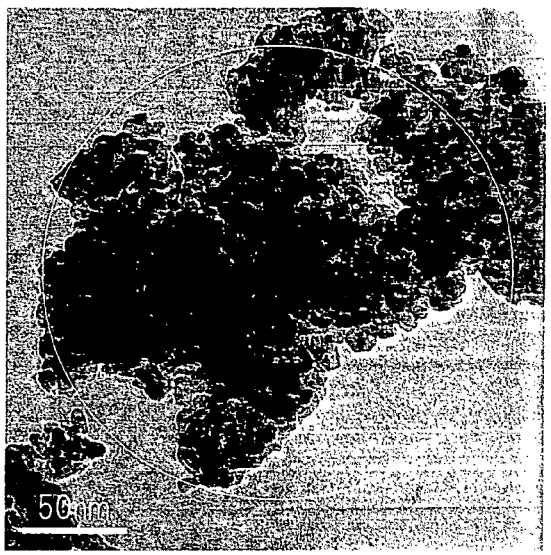
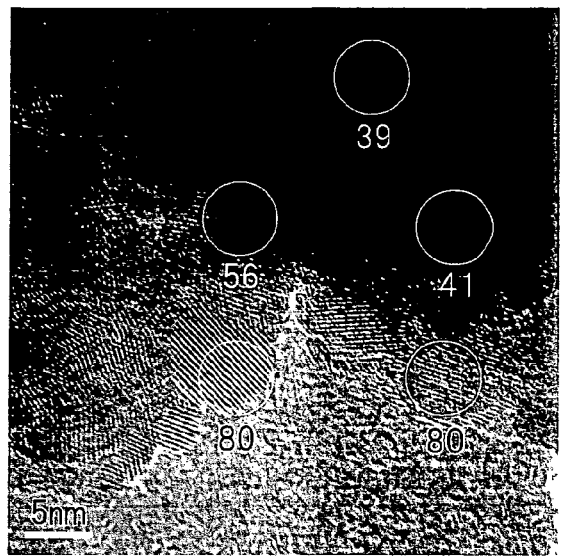
Fig.3
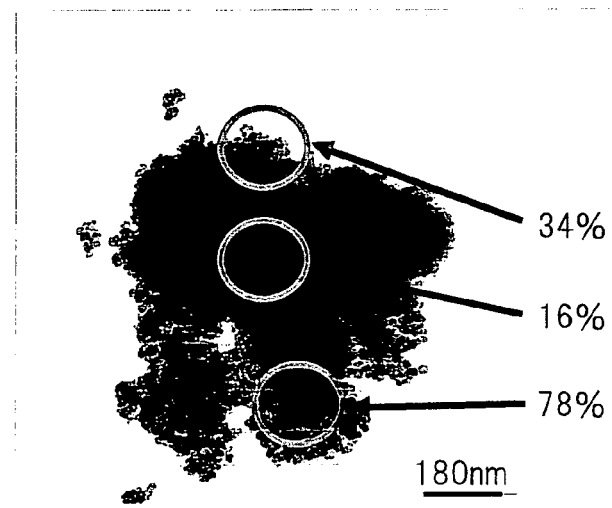

CORE-SHELL STRUCTURE, PROCESS FOR ITS PRODUCTION, AND EXHAUST GAS PURIFICATION CATALYST COMPRISING CORE-SHELL STRUCTURE

TECHNICAL FIELD

The present invention relates to a core-shell structure, to a process for its production, and to an exhaust gas purification catalyst comprising the core-shell structure.

BACKGROUND ART

Three-way catalysts, which simultaneously perform oxidation of carbon monoxide (CO) and hydrocarbons (HC) and reduction of nitrogen oxides ($NO_x$) have been used in the prior art as exhaust gas purification catalysts for automobiles. Such catalysts that are widely known include catalysts comprising precious metals such as platinum (Pt), rhodium (Rh) or palladium (Pd) supported on porous oxide carriers such as alumina ($Al_2O_3$). For the action of a three-way catalyst to simultaneously and effectively accomplish purification of the three components CO, HC and $NO_x$, it is important for the air/fuel ratio (A/F ratio) supplied to the automobile engine to be controlled to the vicinity of the theoretical air/fuel ratio (stoichiometric ratio).

However, since the actual air/fuel ratio fluctuates around the stoichiometric value from the rich (fuel-rich atmosphere) end to the lean (fuel-lean atmosphere) end, depending on the running conditions of the automobile as well as other factors, the exhaust gas atmosphere also fluctuates to the rich end or lean end. Consequently, it is not always possible to ensure high purification performance with a three-way catalyst alone. In order to absorb the fluctuation in oxygen concentration of exhaust gas to increase the exhaust gas purification power of three-way catalysts, materials such as ceria ($CeO_2$), that have an oxygen storage capacity (OSC) that allows them to store oxygen when the exhaust gas has a high oxygen concentration and release oxygen when the exhaust gas has a low oxygen concentration, have come to be employed in exhaust gas purification catalysts.

In order to prevent sintering of the precious metals acting as the active species in such exhaust gas purification catalysts even when they are used at high temperatures (for example, about 1000° C.), it is important for the precious metals to be retained in a highly dispersed stated as fine particles on the carrier. It is generally known that rare earth oxides have strong affinity with precious metals supported thereon and therefore prevent sintering of the precious metals. However, rare earth oxides such as ceria have low heat resistance and themselves undergo sintering at high temperatures of 1000° C. and above, and as a result the precious metals supported on such rare earth oxides also undergo sintering. For purposes such as exhaust gas purification catalysts, therefore, it is necessary to improve the heat resistance of the rare earth oxides themselves, such as ceria.

Japanese Unexamined Patent Publication No. 2005-313024 (Patent document 1) describes an exhaust gas purification catalyst characterized as being a catalyst with a precious metal supported on a particulate carrier, the particulate carrier comprising a core section composed mainly of zirconia ($ZrO_2$) and a shell section composed mainly of ceria ($CeO_2$), and the $CeO_2$ content of the particulate carrier being between 40 mol % and 65 mol %, and states that the catalyst simultaneously has improved heat resistance due to the $ZrO_2$ and inhibited sintering of precious metals due to the $CeO_2$.

Also, Japanese Unexamined Patent Publication No. 2005-254047 (Patent document 2) describes an exhaust gas purification catalyst that comprises metal oxide particles containing ceria and either or both alumina and silica, and a precious metal supported on the metal oxide particles, wherein the metal oxide particles have a core section with a larger molar total of alumina and silica than the molar content of ceria and a surface layer with a larger number of moles of ceria than the molar total of alumina and silica, and the publication states that this catalyst has improved heat resistance for an exhaust gas purification catalyst with OSC due to ceria, because of the core section which is rich in either or both alumina and silica.

Japanese Unexamined Patent Publication No. 2005-314134 (Patent document 3) describes metal oxide particles having a core section containing a relatively large amount of ceria-zirconia solid solution and a shell section containing a relatively large amount of a second metal oxide comprising ceria or zirconia, and states that using ceria as the second metal oxide can provide OSC due to the ceria-zirconia solid solution in the core section while preventing sintering of the precious metal by the ceria in the shell section.

Japanese Unexamined Patent Publication No. 2005-313028 (Patent document 4) describes an exhaust gas purification catalyst having rhodium supported on metal oxide particles, wherein the metal oxide particles comprise a core section containing a relatively large amount of ceria and a shell section containing a relatively large amount of zirconia, and states that the catalyst exhibits OSC by the ceria in the core section and high heat resistance by the zirconia in the shell section.

Finally, Japanese Unexamined Patent Publication HEI No. 9-255331 (Patent document 5) describes a process for production of nanometer-sized monodisperse rare earth oxide and complex oxide ultrafine particles, wherein aqueous solutions containing different solubilized rare earth ions and a precipitating agent solubilized in the same manner are mixed and reacted, the site of reaction being the interiors of surfactant-forming reversed micelles in a nonpolar organic solvent, and states that the process allows production of monodispersed rare earth oxide ultrafine particles and complex oxide ultrafine particles with very small mean particle sizes, without using a high pressure, high-temperature process.

In Patent documents 1-4, the sols of metal oxides that are to form the core section and shell section are sequentially aggregated utilizing the difference in their isoelectric points, to produce a core-shell structure comprising a core section composed mainly of a first metal oxide and a shell section composed mainly of a second metal oxide. However, the core-shell structures produced by such processes do not allow easy control of the shell section thicknesses on the nanolevel, and thus there is a need for improvement in order to achieve an effect of increasing the heat resistance of the core-shell structure resulting from the metal oxides composing the core sections.

Although Patent document 5 describes production of nanometer-sized monodisperse rare earth oxide and complex oxide ultrafine particles by a reversed micelle method, it neither mentions nor suggests production of complex oxide particles with a core-shell structure.

It is therefore an object of the present invention to provide a core-shell structure having a controlled shell section thickness on the nanolevel, and therefore improved properties, and especially heat resistance, resulting from the material of the core section, as well as a process for its production.

It is another object of the invention to provide an exhaust gas purification catalyst that comprises the core-shell structure.

DISCLOSURE OF THE INVENTION

The invention that solves the aforementioned problems is as follows.

(1) A core-shell structure characterized by comprising a core section composed mainly of a first metal oxide and a shell section composed mainly of a second metal oxide different from the first metal oxide, wherein the thickness of the shell section is no greater than 20 nm.

(2) A core-shell structure according to (1) above, characterized in that the first metal oxide is selected from the group consisting of zirconia, alumina, silica, titania and combinations thereof.

(3) A core-shell structure according to (1) or (2) above, characterized in that the second metal oxide is selected from the group consisting of rare earth oxides and combinations of two or more rare earth oxides.

(4) A process for production of a core-shell structure, characterized by comprising (a) a step of mixing a surfactant-containing organic solvent with an aqueous solution containing a first metal oxide precursor to form reversed micelles that comprise the aqueous solution containing the first metal oxide precursor in their interiors, (b) a step of introducing a basic aqueous solution into the reversed micelle interiors to form a hydroxide of the first metal oxide precursor, (c) a step of treating the obtained hydroxide with an aqueous solution containing a compound with at least two carboxyl groups to bond the hydroxide with at least one of the carboxyl groups, (d) a step of adding an aqueous solution containing a second metal oxide precursor different from the first metal oxide precursor to the treated hydroxide to bond the second metal oxide precursor with at least one of the remaining carboxyl groups of the compound with at least two carboxyl groups, (e) a step of introducing a basic aqueous solution into the reversed micelles of step (d) to form a precipitate, and (f) a step of drying and firing the precipitate.

(5) A process according to (4) above, characterized in that the molar ratio of the metal elements M1 and M2 (M2/M1) composing the first metal oxide precursor and second metal oxide precursor is larger than 0.2 and smaller than 2.0.

(6) A process according to (4) or (5) above, characterized in that the compound with at least two carboxyl groups is selected from the group consisting of oxalic acid, malonic acid, succinic acid, glutaric acid, adipic acid, pimelic acid, hemimellitic acid, trimesic acid and mellophanic acid.

(7) An exhaust gas purification catalyst comprising a core-shell structure according to any one of (1)-(3) above or a core-shell structure produced by a process according to any one of (4)-(6) above.

According to the core-shell structure of the invention it is possible to control the shell section thickness on the nanolevel, and therefore notably improve the properties, especially heat resistance, resulting from the material of the core section. In addition, since zirconia is used as the material of the core section and ceria is used as the material of the shell section, an exhaust gas purification catalyst supporting a precious metal as the catalytically active species not only has improved heat resistance for the core-shell structure due to the strong affinity of ceria for precious metals, but can also limit sintering of the precious metal under high temperature use conditions and therefore has notably improved catalytic activity.

BRIEF DESCRIPTION OF THE DRAWINGS

FIG. 2(a) is a TEM photograph showing an aggregate obtained by aggregation of numerous core-shell structures prepared in Example 1.

FIG. 2(b) is an enlarged TEM photograph showing the edges of the aggregate shown in FIG. 2(a).

FIG. 3 is a TEM photograph showing an aggregate obtained by aggregation of numerous core-shell structures prepared according to the prior art.

BEST MODE FOR CARRYING OUT THE INVENTION

Figure 1:
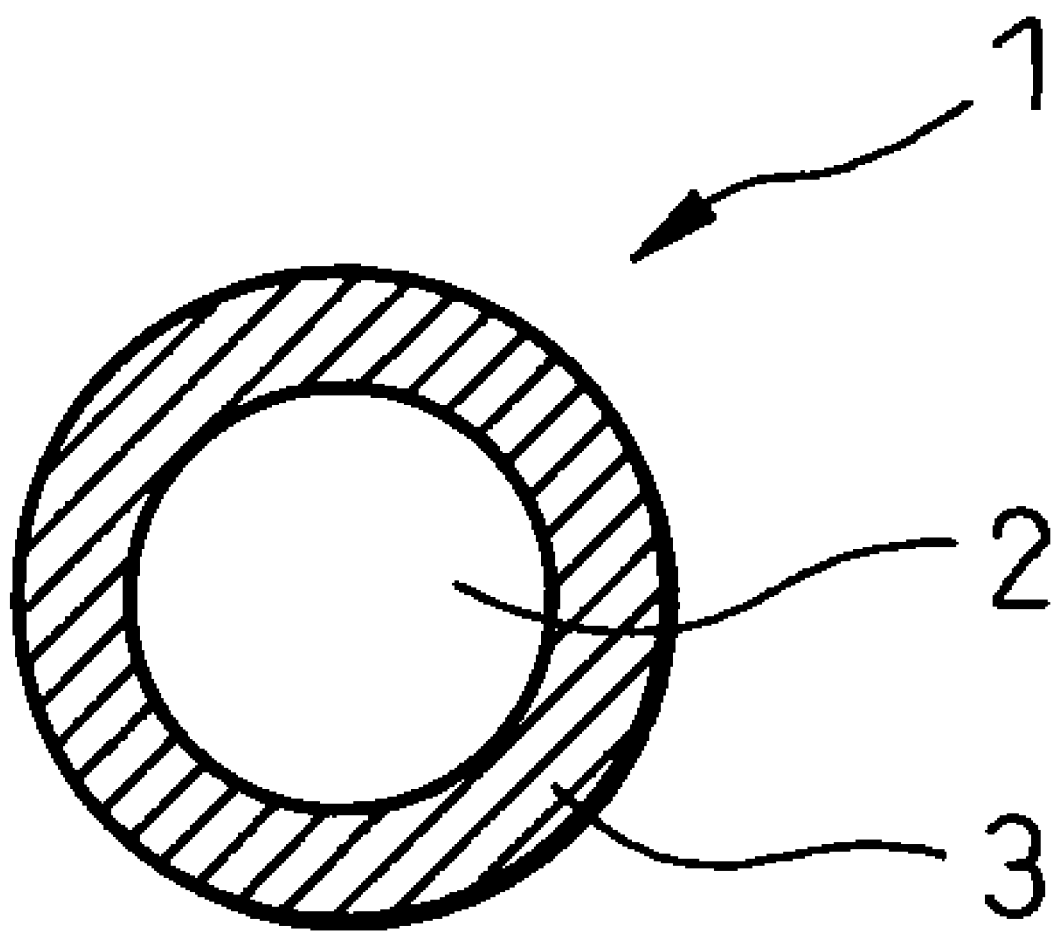
FIG. 1 is a schematic drawing of the cross-section of a core-shell structure according to the invention.

The present invention will now be explained in greater detail with regard to a core-shell structure constructed of two or more different metal oxides used for exhaust gas purification catalysts, and a process for its production, but the invention is not limited to this specific use and, needless to mention, may be applied for any of a wide range of uses that include a core-shell structure composed of two or more different metal oxides.

The core-shell structure of the invention is characterized by comprising a core section composed mainly of a first metal oxide and a shell section composed mainly of a second metal oxide different from the first metal oxide, wherein the thickness of the shell section is no greater than 20 nm.

FIG. 1 is a schematic drawing of the cross-section of a core-shell structure according to the invention. The core-shell structure 1 of the invention comprises a core section 2 composed mainly of a first metal oxide and a shell section 3 composed mainly of a second metal oxide different from the first metal oxide.

According to the invention, there are no particular restrictions on the first metal oxide composing the core section of the core-shell structure, and any metal oxide commonly used in catalyst carriers or oxygen absorption/release materials may be employed. As preferred examples for the first metal oxide there may be mentioned zirconia, alumina, silica, titania and their mixtures. These metal oxides have high heat resistance, and therefore when used as materials to form core sections according to the invention they notably improve the heat resistance of the core-shell structure. The content of the first metal oxide in the core section is preferably 50 mol % or greater.

According to the invention, zirconia is most preferably used as the first metal oxide.

The core section of the core-shell structure of the invention may further comprise a metal oxide which is different from the first metal oxide, in addition to the first metal oxide. For example, the core section may further contain an oxide of one or more metals selected from the group consisting of alkaline earth metals and rare earth elements. By adding such additional metal oxides it is possible to further increase the heat resistance of the core-shell structure of the invention. As specific examples of additional metal oxides there may be mentioned lanthanum oxide ($La_2O_3$), ceria ($CeO_2$), praseodymium oxide ($Pr_6O_{11}$), yttria ($Y_2O_3$), neodymium oxide ($Nd_2O_3$) and combinations thereof, with lanthanum oxide being particularly preferred according to the invention.

According to the invention, there are no particular restrictions on the second metal oxide composing the shell section of the core-shell structure, and any metal oxide commonly used in catalyst carriers or oxygen absorption/release materials may be employed. As preferred examples for the second metal oxide there may be mentioned rare earth oxides and combinations of two or more rare earth oxides. These metal oxides have strong affinity for precious metals, and therefore when used as materials for the shell section according to the invention they can prevent the precious metals supported thereon from undergoing sintering at high temperature. The content of the second metal oxide in the shell section is preferably 20 mol % or greater.

According to the invention, ceria is most preferably used as the second metal oxide.

Also according to the invention, the thickness of the shell section is preferably no greater than 20 nm.

By limiting the thickness of the shell section to no greater than 20 nm it is possible to notably improve the heat resistance of the core-shell structure, and therefore prevent heat-sintering of the second metal oxide in the shell section and thus maintain a high surface area of the core-shell structure. In addition, since a rare earth oxide such as ceria is used as the second metal oxide and such rare earth oxides have high affinity for precious metals in catalysts supporting precious metals as the catalytically active species, it is possible to minimize sintering of the precious metal under high temperature use conditions and therefore notably improve the activity of the catalyst. If the thickness of the shell section exceeds 20 nm, the heat resistance of the core-shell structure will be reduced and the second metal oxide composing the shell section will aggregate resulting in a smaller surface area of the core-shell structure, and therefore the thickness of the shell section is preferably no greater than 20 nm and even more preferably no greater than 10 nm. On the other hand, the thickness of the shell section is preferably at least 3 nm in order to prevent sintering of the precious metal.

The particle size of the core-shell structure of the invention is preferably 10-100 nm.

The core-shell structure of the invention, which comprises a core section composed mainly of a first metal oxide and a shell section composed mainly of a second metal oxide different from the first metal oxide, may be prepared using a reversed micelle method.

In core-shell structures produced by conventional methods, namely core-shell structures produced by varying the pH of a mixed sol comprising a sol of a first metal oxide and a sol of a second metal oxide which have different isoelectric points, in order to successively aggregate the metal oxides, it has been possible to form shell sections with thicknesses on the microlevel, but it has been difficult to form shell sections with thicknesses on the nanolevel. Consequently, the effects obtained from the first metal oxide composing the core section, such as effects of improved heat resistance, are often not sufficiently exhibited in the core-shell structures. Such methods require that the first metal oxide and second metal oxide have different isoelectric points, and therefore cannot be easily applied when the isoelectric points of the metal oxides are the same or very similar.

According to the process of the invention, it is possible to reduce the thickness of the shell section to the nanolevel by preparation using the reversed micelle method, and thus notably improve the properties, and especially the heat resistance, of the obtained core-shell structure. Also according to the invention, unlike the conventional method, a core-shell structure composed of the first metal oxide and second metal oxide may be prepared without regard to the isoelectric points of the metal oxides composing the core section and shell section, so that core-shell structures with various combinations may be produced.

More specifically, the core-shell structure of the invention can be produced by a process characterized by comprising (a) a step of mixing a surfactant-containing organic solvent with an aqueous solution containing a first metal oxide precursor to form reversed micelles that comprise the aqueous solution containing the first metal oxide precursor in their interiors, (b) a step of introducing a basic aqueous solution into the reversed micelle interiors to form a hydroxide of the first metal oxide precursor, (c) a step of treating the obtained hydroxide with an aqueous solution containing a compound with at least two carboxyl groups to bond the hydroxide with at least one of the carboxyl groups, (d) a step of adding an aqueous solution containing a second metal oxide precursor different from the first metal oxide precursor to the treated hydroxide to bond the second metal oxide precursor with at least one of the remaining carboxyl groups of the compound with at least two carboxyl groups, (e) a step of introducing a basic aqueous solution into the reversed micelles of step (d) to form a precipitate, and (f) a step of drying and firing the precipitate, and characterized in that the molar ratio of the metal elements M1 and M2 composing the first metal oxide precursor and second metal oxide precursor (M2/M1) is greater than 0.2 and smaller than 2.0.

The organic solvent used for the process of the invention is not particularly restricted, and there may be mentioned hydrocarbons such as cyclohexane and benzene, straight-chain alcohols such as hexanol and ketones such as acetone. The criteria for selection of the organic solvent may be solubility of the surfactant, or the range in which a microemulsion is formed (a large water/surfactant molar ratio).

There are no particular restrictions on the surfactant used to form the reversed micelles in the method of the invention, and there may be mentioned nonionic surfactants, anionic surfactants and cationic surfactants, appropriately selected in combination with the organic solvent. These surfactants may be added to the organic solvent in sufficient amounts and concentrations to form reversed micelles comprising the first metal oxide precursor-containing aqueous solution in their interiors.

As nonionic surfactants there may be used polyoxyethylenenonylphenyl ether-based surfactants such as polyoxyethylene (n=5) nonylphenyl ether, polyoxyethyleneoctylphenyl ether-based surfactants such as polyoxyethylene (n=10) octylphenyl ether, polyoxyethylenealkyl ether-based surfactants such as polyoxyethylene (n=7) cetyl ether, and polyoxyethylenesorbitan-based surfactants such as polyoxyethylenesorbitan trioleate.

As anionic surfactants there may be used sodium di-2-ethylenehexylsulfosuccinate and the like, and as cationic surfactants there may be used cetyltrimethylammonium chlorite or cetyltrimethylammonium bromide.

According to the process of the invention, a small amount of a $C_4$-$C_8$ alcohol such as hexanol may be added as an auxiliary agent for the surfactant, in order to stabilize the formed reversed micelles.

By mixing an aqueous solution containing the first metal oxide precursor with a solution containing the organic solvent, surfactant and optionally an auxiliary agent for the surfactant, it is possible to form reversed micelles whose interiors comprise solution containing the first metal oxide precursor.

According to the method of the invention, a hydroxide of the first metal oxide precursor is formed by introducing a basic aqueous solution such as ammonia water into the aqueous phase in the reversed micelles that have been formed, for hydrolysis of the first metal oxide precursor.

The first metal oxide precursor is a compound of the metal corresponding to the first metal oxide which is to form the core section, and any desired metal compound that forms a hydroxide with a basic aqueous solution/hydrolysis may be used. As examples of such metal compounds there may be mentioned nitric acid salts, oxynitric acid salts, chlorides, carbonic acid salts and acetic acid salts of metals selected from the group consisting of zirconium, aluminum, silicon and titanium.

According to the method of the invention, one or more metal compounds selected from the group consisting of alkaline earth metals and rare earth elements may be added in addition to the first metal oxide precursor during formation of the reversed micelles. Such additional metal compounds will form a solid solution with the first metal oxide precursor in the core section of the final core-shell structure, in the form of their respective oxides. By adding such additional metal compounds it is possible to further increase the heat resistance of the core-shell structure of the invention. As specific examples of such additional metal compounds there may be mentioned nitric acid salts, oxynitric acid salts, chlorides, carbonic acid salts and acetic acid salts of metals selected from the group consisting of lanthanum (La), cerium (Ce), praseodymium (Pr), yttrium (Y), neodymium (Nd) and combinations thereof.

According to the method of the invention, the metal hydroxide obtained by hydrolysis of the first metal oxide precursor with the basic aqueous solution may be treated with an aqueous solution containing a compound with at least two carboxyl groups, to bond the metal hydroxide with at least one of the carboxyl groups. Specifically, substitution reaction takes place between the hydroxyl group of the metal hydroxide and the compound with at least two carboxyl groups, or in other words, the hydroxyl group of the metal hydroxide undergoes dehydrating condensation with at least one of the carboxyl groups of the compound, forming a bond between the metal hydroxide and the compound. Subsequent addition of the second metal oxide precursor-containing aqueous solution to the treated metal hydroxide results in bonding of the second metal oxide precursor with at least one of the remaining carboxyl groups of the compound with two or more carboxyl groups. As a result, the second metal oxide precursor and the metal hydroxide obtained from the first metal oxide precursor become bonded via the compound with two or more carboxyl groups.

The bond between the second metal oxide precursor and at least one of the remaining carboxyl groups of the compound with two or more carboxyl groups may be any type of bond, such as a coordination bond or ionic bond.

The second metal oxide precursor used for the method of the invention is a compound of the metal corresponding to the second metal oxide which is to form the shell section, and it may be any metal compound that forms a bond by reaction with carboxyl groups. As examples of such metal compounds there may be mentioned nitric acid salts, oxynitric acid salts, chlorides, carbonic acid salts and acetic acid salts of at least one type of metal selected from among rare earth elements.

According to the method of the invention, the compound with at least two carboxyl groups may be any desired carboxylic acid that is water-soluble and has two or more carboxyl groups capable of bonding the metal hydroxide obtained from the first metal oxide precursor and the second metal oxide precursor, and for example, there may be used $C_2$-$C_{30}$ and especially $C_2$-$C_{10}$ dicarboxylic acids, tricarboxylic acids, tetracarboxylic acids, benzenedicarboxylic acids, benzenetricarboxylic acids and benzenetetracarboxylic acids. These compounds can be introduced into the aqueous phase of the reversed micelles in sufficient amounts and concentrations to allow bonding between the second metal oxide precursor and the metal hydroxide obtained from the first metal oxide precursor.

As more specific dicarboxylic acids there may be mentioned oxalic acid, malonic acid, succinic acid, glutaric acid, adipic acid and pimelic acid. As more specific tricarboxylic acids there may be mentioned hemimellitic acid (1,2,3-benzenetricarboxylic acid) and trimesic acid (1,3,5-benzenetricarboxylic acid). As a more specific tetracarboxylic acid there may be mentioned mellophanic acid (1,2,3,4-benzenetetracarboxylic acid). Oxalic acid is most preferably used for the method of the invention.

A basic aqueous solution such as ammonia water is then introduced into the aqueous phase inside the reversed micelles containing the second metal oxide precursor and the metal hydroxide obtained from the first metal oxide precursor, which are bonded via carboxylic acid, until the pH of the solution reaches 9 or higher, for example, to form a precipitate which is then dried and fired to produce a core-shell structure comprising a core section composed mainly of the first metal oxide and a shell section composed mainly of the second metal oxide, which is different from the first metal oxide. This ensures reliable and highly dispersed bonding of the second metal oxide precursor on the metal hydroxide obtained from the first metal oxide precursor via the carboxylic acid, so that drying and firing of the obtained precipitate can yield a core-shell structure with the core section composed mainly of the first metal oxide uniformly covered with the shell section composed mainly of the second metal oxide.

Drying and firing of the precipitate is carried out at a sufficient temperature and for sufficient time to remove the compound with at least two carboxyl groups and obtain a core-shell structure comprising a core section composed mainly of the first metal oxide and containing an optionally selected additional metal oxide, and a shell section composed mainly of the second metal oxide. For example, the drying may be carried out under reduced pressure or at ordinary pressure for 3-24 hours at a temperature of 80-250° C., and the firing carried out at 500-800° C. for 1-5 hours.

In the method of the invention, the first metal oxide precursor and second metal oxide precursor are preferably added in ranges such that the molar ratio of the metal elements M1 and M2 composing them (M2/M1) is larger than 0.2 and smaller than 2.0.

By adding the first metal oxide precursor and second metal oxide precursor in such ranges, it is possible to control the thickness of the shell section of the obtained core-shell structure on the nanolevel, e.g. below 20 nm and especially below 10 nm. Since the heat resistance of the core-shell structure is increased by the first metal oxide, such as zirconia, in the core section of the core-shell structure, it is possible to minimize heat-induced sintering of the second metal oxide, such as ceria, in the shell section, and thus maintain a high surface area for the core-shell structure.

If the M2/M1 ratio is less than 0.2, the low amount of added second metal oxide precursor may result in sections of the core-shell structure that are not completely covered by the second metal oxide, while if the M2/M1 ratio is greater than 2.0, the large amount of added second metal oxide precursor may result in a shell section (second metal oxide) thickness of greater than 20 nm in the obtained core-shell structure. Thus, the first metal oxide precursor and second metal oxide precursor are preferably added in amounts such that the molar ratio of the metal elements M1 and M2 composing them (M2/M1) is in the range of 0.2<M2/M1<2.0, and more preferably in the range of $0.4 \leq M2/M1 \leq 1.6$.

According to another mode of the invention, the core-shell structure is used as a catalyst carrier and a precious metal selected from the group consisting of platinum (Pt), rhodium (Rh), palladium (Pd), iridium (Ir), ruthenium (Ru) and combinations thereof is loaded as an active component on the catalyst carrier. When a rare earth oxide such as ceria is used in the shell section of the core-shell structure, the high affinity of the rare earth oxide for the precious metal prevents sintering of the supported precious metal at high temperature, thus allowing an exhaust gas purification catalyst with notably improved catalytic activity to be obtained.

Loading of the precious metal onto the core-shell structure may be accomplished by any method known to those skilled in the art.

For example, such a precious metal may be loaded by using a compound containing the precious metal in cation form as the precious metal source, immersing the core-shell structure in a solution of the compound at a prescribed concentration and then drying and firing it, or using a complex of the precious metal as the precious metal source and immersing the core-shell structure in a solution of the complex at a prescribed concentration and then drying and firing it. Such precious metals will usually be loaded onto the core-shell structure at a loading weight of 0.1-10 wt %.

The firing and drying of the core-shell structure that has been immersed in the solution containing the precious metal compound or complex may be carried out at a sufficient temperature and for a sufficient time to support the precious metal on the core-shell structure. For example, the drying may be carried out at 80-250° C. for 6-24 hours, and the firing carried out at a temperature of 500-800° C. for 1-5 hours.

EXAMPLES

The present invention will now be explained in greater detail through the following examples, with the understanding that these examples are in no way limitative on the invention.

In these examples, complex oxides having a core-shell structure with a core section composed mainly of zirconia and a shell section composed mainly of ceria were prepared by the method of the invention, and their structures and heat resistances were examined.

Example 1

First, cyclohexane as an organic solvent, poly(oxyethylene)=octylphenyl ether (Triton X-100) as a surfactant and n-hexanol as a surfactant auxiliary agent were combined in a volume ratio of 2.3:1:1.6 and a solution thereof prepared to 1710 cm$^3$, after which a solution of 21 g of zirconium oxynitrate dihydrate ($ZrO(NO_3)_2 \cdot 2H_2O$) and 0.7 g of lanthanum nitrate hexahydrate ($La(NO_3)_3 \cdot 6H_2O$) in 81 g of purified water was added thereto. Next, 9 cm$^3$ of 28% ammonia water was added and the mixture was stirred for 1 hour. After then adding 10 ml of a 1 M oxalic acid aqueous solution thereto and stirring for 3 hours, a solution of cerium ammonium nitrate ($Ce(NH_4)_2(NO_3)_6$) dissolved in 40 cm$^3$ of purified water was added to a Ce/Zr molar ratio of 1.2, and stirring was continued for 15 hours. Next, 28% ammonia water was added until the pH of the mixture exceeded 9 to produce a precipitate, which was separated by centrifugation and then vacuum dried at 120° C. for 3 hours and fired at 700° C. for 5 hours, to obtain a complex oxide with a core-shell structure comprising a core section composed mainly of zirconia and a shell section composed mainly of ceria.

Examples 2-6

Complex oxides with a core-shell structure comprising a core section composed mainly of zirconia and a shell section composed mainly of ceria were obtained in the same manner as Example 1, except that the amount of cerium ammonium nitrate was changed for a Ce/Zr molar ratio of 0.2 (Example 2), 0.4 (Example 3), 0.8 (Example 4), 1.6 (Example 5) or 2.0 (Example 6).

Comparative Example 1

A complex oxide comprising zirconia and ceria was obtained in the same manner as Example 1, except that no oxalic acid was added.

Comparative Example 2

A complex oxide composed of a solid solution of cerium and zirconia without a core-shell structure was prepared for this example.

First, 21 g of zirconium oxynitrate, 0.7 g of lanthanum nitrate hexahydrate and 51 g of cerium ammonium nitrate were dissolved in 582 cm$^3$ of purified water. Next, 9 cm$^3$ of 28% ammonia water was added to the mixture to produce a precipitate, which was separated by centrifugation and then vacuum dried at 120° C. for 3 hours and fired at 700° C. for 5 hours, to obtain a complex oxide composed of a solid solution of zirconia and ceria.

Comparative Example 3

For this example, a complex oxide having a core-shell structure with a core section composed mainly of zirconia and a shell section composed mainly of ceria was prepared by a conventional method.

First, an aqueous solution of a ceria sol, an aqueous solution of a zirconia sol and an aqueous solution of a yttria ($Y_2O_3$) sol were combined in amounts so that $CeO_2:ZrO_2:Y_2O_3$=60:36:4 (weight ratio). To the mixed sol solution there was added dropwise nitric acid water to pH 3 and then ammonia water to pH 10. The mixture was then dried at 120° C. for 24 hours and fired at 700° C. for 5 hours, to obtain a complex oxide with a core-shell structure comprising a core section composed mainly of zirconia and a shell section composed mainly of ceria.

[Evaluation of Complex Oxide Structure and Performance]

The complex oxides obtained in the examples and comparative examples were measured using a transmission electron microscope with energy dispersive X-ray spectrometer (TEM-EDX) (HF-2000 by Hitachi) to determine the thickness and cerium concentration of the ceria layer of the shell section.

FIG. 2(a) is a TEM photograph showing an aggregate obtained by aggregation of numerous core-shell structures prepared in Example 1, and FIG. 2(b) is an enlarged TEM photograph showing the edges of the aggregate shown in FIG. 2(a). The numbers in FIG. 2(b) represent the cerium (Ce) concentrations of the encircled sections. The Ce concentration clearly decreased form the edge toward the center of the aggregate. Since the photograph in FIG. 2 is a transmission image, the measured Ce concentration at the center of the aggregate is not only that of the surface of the aggregate but also includes the bulk of the aggregate. The Ce concentration at the edges of the aggregate was therefore measured in order to analyze the composition of the surface of the obtained core-shell structure.

As clearly seen from the TEM photograph shown in FIG. 2(b), the Ce concentration at the edges of the aggregate, i.e. at the shell sections of the core-shell structures composing the aggregate, was 80%, or much higher than the Zr concentration. Thus, it was confirmed that the method of the invention forms a complex oxide having a core-shell structure comprising a core section composed mainly of zirconia and a shell section composed mainly of ceria.

FIG. 3 is a TEM photograph showing an aggregate obtained by aggregation of numerous core-shell structures prepared in Comparative Example 3. FIG. 3, in contrast to FIG. 2(b), shows aggregate edges with a low Ce concentration of 34%, while the non-edge regions included areas with a Ce concentration of 78% which was higher than the Zr concentration. It also shows that using the method of the invention permits more reliable synthesis of a core-shell structure with a core section composed mainly of zirconia and a shell section composed mainly of ceria, compared to the prior art method.

The complex oxides prepared in Example 1, Comparative Example 1 and Comparative Example 2 were then subjected to a test by holding at 1000° C. for 3 hours while switching between a rich model gas and lean model gas every minute, using the durability testing model gases shown in Table 1 below.

TABLE 1

Durability testing model gas compositions

| Gas composition | $N_2$ | $CO_2$ (%) | NO (ppm) | CO (%) | $C_3H_6$ (ppm) | $H_2$ (%) | $O_2$ (%) | $H_2O$ (%) |
|---|---|---|---|---|---|---|---|---|
| Rich | Balance | 10 | 2200 | 2.80 | 2500[a] | 0.27 | 0.77 | 10 |
| Lean | Balance | 10 | 2200 | 0.81 | 2500[a] | 0 | 1.7 | 10 |

[a]Carbon concentration in $C_3H_6$

Table 2 shows the values of the isoelectric points and specific surface areas (SSA) after durability testing by BET, for each of the complex oxides prepared in Example 1, Comparative Example 1 and Comparative Example 2. For reference, the values for the isoelectric points and the specific surface areas (SSA) after durability testing by BET for ceria ($CeO_2$) and zirconia ($ZrO_2$) alone are also shown. Measurement of the isoelectric point was conducted using a zeta-potential measuring apparatus (MARK2, product of Rank Brothers).

TABLE 2

Effect of preparation method

| Sample | | Isoelectric point | SSA ($m^2/g$) after durability testing | Remark |
|---|---|---|---|---|
| Example 1 | $CeO_2$/$ZrO_2$—$La_2O_3$ | 7.8 | 18.1 | |
| Comp. Ex. 1 | No oxalic acid-addition | 6.1 | 14.3 | |
| Comp. Ex. 2 | $CeO_2$—$ZrO_2$ solid solution | 6.3 | 16.9 | Areas not covered with $CeO_2$ observed |
| | $CeO_2$ alone | 7.6 | 7.3 | |
| | $ZrO_2$ alone | 4.3 | 13.0 | |

The results in Table 2 demonstrate clear differences in the isoelectric points of the complex oxides of Example 1 and Comparative Examples 1 and 2, with the complex oxide of Example 1 exhibiting an isoelectric point value near to that of $CeO_2$ alone, and the complex oxide of Comparative Example 1 that contained no added oxalic acid exhibiting an isoelectric point value near to that of the ceria-zirconia solid solution of Comparative Example 2. The complex oxides of Example 1 and Comparative Examples 1 and 2 had the same composition of cerium and zirconium (Ce/Zr molar ratios of 1.2), and therefore the difference between them was attributed to the differences in the forms of ceria ($CeO_2$) and zirconia ($ZrO_2$) in the complex oxides. Specifically, it is believed that the complex oxide of Example 1 exhibited an isoelectric point value near to that of $CeO_2$ alone because the $CeO_2$ was present surrounding the $ZrO_2$ nuclei, as shown in FIG. 1, while the complex oxides of Comparative Examples 1 and 2 exhibited isoelectric points midway between $CeO_2$ alone and $ZrO_2$ alone because the $CeO_2$ and $ZrO_2$ were present as a solid solution. These results indicate that a compound with at least two carboxyl groups, and especially oxalic acid, is extremely important for forming a core-shell structure according to the invention.

As Table 2 shows, the specific surface areas after durability testing of the complex oxides and of $CeO_2$ and $ZrO_2$ alone were highest with the complex oxide of Example 1, with a value that was even higher than for $ZrO_2$ alone.

The complex oxides prepared in Examples 1-6 were then measured to determine their isoelectric points and specific surface areas (SSA) after durability testing by BET in the same manner as above, and as well as their shell section thicknesss (nm). The results are shown in Table 3 below.

TABLE 3

Effect of Ce/Zr ratio

| | Ce/Zr ratio (molar ratio) | Isoelectric point | SSA after durability testing ($m^2/g$) | Thickness of shell section (nm) |
|---|---|---|---|---|
| Example 1 | 1.2 | 7.8 | 18.1 | 5.0 |
| Example 2 | 0.2 | 5.9 | 16.5 | Areas not covered by $CeO_2$ observed |
| Example 3 | 0.4 | 7.6 | 18.5 | 3.4 |
| Example 4 | 0.8 | 7.3 | 17.9 | 4.8 |
| Example 5 | 1.6 | 7.6 | 17.9 | 10.2 |
| Example 6 | 2.0 | 7.7 | 11.2 | 23.0 |

As shown in Table 3, the complex oxides with Ce/Zr molar ratios in the range of 0.2<Ce/Zr<2.0 (Examples 1, 3, 4 and 5) had isoelectric point values that were almost the same as that of $CeO_2$ alone, and the shell section thicknesses were also limited to no greater than about 10 nm, and therefore high specific surface area values could be maintained after durability testing. However, the complex oxide which had a Ce/Zr molar ratio of 0.2 (Example 2) had its isoelectric point value notably shifted toward that of $ZrO_2$ alone, and TEM-EDX analysis also revealed a core-shell structure with several areas not covered by $CeO_2$. The complex oxide which had a Ce/Zr molar ratio of 2.0 (Example 6) had a large shell section thickness of 23.0 nm, and therefore the specific surface area after durability testing was significantly reduced compared to the other examples. These results demonstrate that if the Ce/Zr molar ratio is controlled to a range of 0.2<Ce/Zr<2.0 and especially the range of 0.4≦Ce/Zr≦1.6, it is possible to obtain a core-shell structure having a shell section composed mainly of ceria with a thickness on the nanolevel, and thus exhibiting notably improved heat resistance.

The invention claimed is:

1. A core-shell structure for use as a catalyst carrier comprising a core section composed mainly of zirconia as a first metal oxide and a shell section composed mainly of ceria as a second metal oxide different from the first metal oxide, wherein the thickness of the shell section is no greater than 20 nm.

2. A process for production of the core-shell structure of claim 1, comprising:
   (a) a step of mixing a surfactant-containing organic solvent with an aqueous solution containing a first metal oxide precursor to form reversed micelles that comprise the aqueous solution containing the first metal oxide precursor in their interiors,
   (b) a step of introducing a basic aqueous solution into the reversed micelle interiors to form a hydroxide of the first metal oxide precursor,
   (c) a step of treating the obtained hydroxide with an aqueous solution containing a compound with at least two carboxyl groups to bond the hydroxide with at least one of the carboxyl groups,
   (d) a step of adding an aqueous solution containing a second metal oxide precursor different from the first metal oxide precursor to the treated hydroxide to bond the second metal oxide precursor with at least one of the remaining carboxyl groups of the compound with at least two carboxyl groups,
   (e) a step of introducing a basic aqueous solution into the reversed micelles of step (d) to form a precipitate, and
   (f) a step of drying and firing the precipitate,
   wherein the first metal oxide precursor forms a first metal oxide that is composed mainly of zirconia, and the second metal oxide precursor forms a second metal oxide that is composed mainly of ceria.

3. The process according to claim 2, wherein the molar ratio of the metal elements M1 and M2 (M2/M1) composing the first metal oxide precursor and second metal oxide precursor is larger than 0.2 and smaller than 2.0.

4. The process according to claim 3, wherein the compound with at least two carboxyl groups is selected from the group consisting of oxalic acid, malonic acid, succinic acid, glutaric acid, adipic acid, pimelic acid, hemimellitic acid, trimesic acid and mellophanic acid.

5. An exhaust gas purification catalyst comprising a:
   core-shell structure comprising a core section composed mainly of zirconia as a first metal oxide and a shell section composed mainly of ceria as a second metal oxide different from the first metal oxide, wherein the thickness of the shell section is no greater than 20 nm; or
   a core-shell structure produced by a process according to claim 4.

6. An exhaust gas purification catalyst comprising a:
   core-shell structure comprising a core section composed mainly of zirconia as a first metal oxide and a shell section composed mainly of ceria as a second metal oxide different from the first metal oxide, wherein the thickness of the shell section is no greater than 20 nm; or
   a core-shell structure produced by a process according to claim 3.

7. The process according to claim 2, wherein the compound with at least two carboxyl groups is selected from the group consisting of oxalic acid, malonic acid, succinic acid, glutaric acid, adipic acid, pimelic acid, hemimellitic acid, trimesic acid and mellophanic acid.

8. An exhaust gas purification catalyst comprising a:
   core-shell structure comprising a core section composed mainly of zirconia as a first metal oxide and a shell section composed mainly of ceria as a second metal oxide different from the first metal oxide, wherein the thickness of the shell section is no greater than 20 nm; or
   a core-shell structure produced by a process according to claim 7.

9. The process according to claim 2, wherein the first metal oxide is selected from the group consisting of zirconia, alumina, silica, titania and combination thereof.

10. The process according to claim 2, wherein the second metal oxide is selected from the group consisting of rare earth oxides and combinations of two or more rare earth oxides.

11. An exhaust gas purification catalyst comprising:
    a core-shell structure comprising a core section composed mainly of zirconia as a first metal oxide and a shell section composed mainly of ceria as a second metal oxide different from the first metal oxide, wherein the thickness of the shell section is no greater than 20 nm; or
    a core-shell structure produced by a process according to claim 2.

* * * * *